United States Patent
Kondo

(10) Patent No.: US 8,609,229 B2
(45) Date of Patent: Dec. 17, 2013

(54) GLASS/RESIN LAMINATE, AND ELECTRONIC DEVICE USING SAME

(75) Inventor: Satoshi Kondo, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 114 days.

(21) Appl. No.: 13/414,021

(22) Filed: Mar. 7, 2012

(65) Prior Publication Data

US 2012/0171454 A1   Jul. 5, 2012

Related U.S. Application Data

(63) Continuation of application No. PCT/JP2010/065067, filed on Sep. 2, 2010.

(30) Foreign Application Priority Data

Sep. 8, 2009   (JP) ................................. 2009-207411

(51) Int. Cl.
*B32B 7/02*   (2006.01)

(52) U.S. Cl.
USPC ............ 428/212; 428/220; 428/337; 428/435

(58) Field of Classification Search
USPC ........................ 428/212, 220, 337, 411.1, 435
See application file for complete search history.

(56) References Cited

U.S. PATENT DOCUMENTS

| | | | |
|---|---|---|---|
| 5,486,403 A | * | 1/1996 | Ishitaka et al. ................. 428/167 |
| 6,340,545 B1 | * | 1/2002 | Murai et al. ...................... 430/7 |
| 7,192,999 B2 | | 3/2007 | Mercado et al. |

FOREIGN PATENT DOCUMENTS

| | | |
|---|---|---|
| JP | 2003-039597 | 2/2003 |
| JP | 2003-101193 | 4/2003 |
| JP | 2007-076231 | 3/2007 |
| JP | 2007-505973 | 3/2007 |
| JP | 2009-060024 | 3/2009 |
| JP | 2009-182073 | 8/2009 |
| WO | WO-2008/007622 A1 | 1/2008 |
| WO | WO-2010/071145 A1 | 6/2010 |

OTHER PUBLICATIONS

Okuyama et al (JP 2009-060024 machine translation), Mar. 19, 2009.*
International Search Report in PCT/JP2010/065067 dated Nov. 9, 2010.

* cited by examiner

*Primary Examiner* — Mark Ruthkosky
*Assistant Examiner* — Lawrence Ferguson
(74) *Attorney, Agent, or Firm* — Foley & Lardner LLP

(57) ABSTRACT

The present invention relates to a glass/resin laminate containing a glass substrate and a resin layer, in which the resin layer contains a polyimide obtained by condensation-polymerization of an aromatic diamine having a benzoxazole structure with an aromatic tetracarboxylic anhydride, the difference in the average linear expansion coefficient at 25 to 300° C. between the glass substrate and the resin layer is from $-100 \times 10^{-7}$ to $+100 \times 10^{-7}$/° C., and at least one outermost layer of the laminate is the glass substrate.

15 Claims, 2 Drawing Sheets

GLASS/RESIN LAMINATE, AND ELECTRONIC DEVICE USING SAME

TECHNICAL FIELD

The present invention relates to a glass/resin laminate having a glass substrate and a resin layer, and an electronic device using the same.

BACKGROUND ART

In recent years, with the progress in thinning and weight reduction of an electronic device (electronic component) such as organic EL panel, solar cell and thin-film secondary battery, the thinning of the glass substrate for use in such an electronic device progresses. When the strength of the glass substrate is reduced due to the thinning, handling ability of the glass substrate is impaired. Incidentally, in view of the handling ability, it may be also possible to use a resin substrate in place of the glass substrate. However the resin substrate has a problem, for example, in the chemical resistance and moisture permeation resistance.

Accordingly, a glass/resin laminate obtained by providing a resin layer (resin substrate) between two glass substrates (glass films) has been recently proposed (see, for example, Patent Document 1). This glass/resin laminate has chemical resistance and moisture permeation resistance equal to those of the glass substrate and at the same time, has handling ability (impact resistance, flexibility) equal to that of the resin substrate.

Also, it has been recently proposed to use, as the resin layer in the glass/resin laminate, a film containing a polyimide obtained by condensation-polymerizing aromatic diamines having a benzoxazole structure and aromatic tetracarboxylic anhydrides (see, for example, Patent Document 2). The polyimide above has high heat resistance and small difference in the linear expansion coefficient from the glass substrate, compared with the general polyimide.

RELATED ART

Patent Document

Patent Document 1: JP-A-2003-39597
Patent Document 2: JP-A-2009-60024

SUMMARY OF THE INVENTION

Problems that the Invention is to Solve

However, in the glass/resin laminate described in Patent Document 1, the heat resistance of the resin layer and the difference in the linear expansion coefficient between the resin layer and the glass substrate are not mentioned. If the heat resistance of the resin layer is insufficient, the resin layer is considered to deteriorate during heating, for example, in the production process of an electronic device. Also, if the difference in the linear expansion coefficient between the resin layer and the glass substrate is excessively large, this is considered to cause severe warping of the glass/resin laminate or separation of the resin layer from the glass substrate during heating or cooling.

Also, the glass/resin laminate described in Patent Document 2 is applied to a printed circuit board and since the resin layers are stacked on both sides of the glass substrate, the surface flatness is insufficient. Therefore, it is difficult to form an electronic device member (for example, an organic EL element) on the glass/resin laminate surface with a good precision.

The present invention has been made by taking these problems into consideration, and an object of the present invention is to provide a glass/resin laminate excellent in surface flatness and heat resistance, and capable of suppressing the warping or separation during heating or cooling.

Means for Solving the Problems

In order to solve the above problems, the present invention relates to a glass/resin laminate comprising a glass substrate and a resin layer, wherein the resin layer contains a polyimide obtained by condensation-polymerization of an aromatic diamine having a benzoxazole structure with an aromatic tetracarboxylic anhydride, the difference in the average linear expansion coefficient at 25 to 300° C. between the glass substrate and the resin layer is from $-100\times10^{-7}$ to $+100\times10^{-7}$/° C., and at least one outermost layer of the laminate is the glass substrate.

Further, the present invention also relates to:

A glass substrate laminate comprising the glass/resin laminate according to the present invention, a support plate, and a releasable resin layer having a releasable surface, wherein the glass/resin laminate and the support plate are laminated through the releasable resin layer so that the outermost surface of the other outermost layer of the glass/resin laminate and the releasable surface of the releasable resin layer fixed to the surface of the support plate are put into close contact; and a method for producing the same.

Further, the present invention relates to an electronic device comprising the glass/resin laminate according to the present invention, and a method for producing the same.

Advantage of the Invention

According to the present invention, a glass/resin laminate excellent in the surface flatness and heat resistance and capable of suppressing the warping or separation during heating or cooling can be provided. Also, when the glass/resin laminate is stacked on a support plate having fixed thereto a releasable resin layer having a releasable surface, the glass/resin laminate can be enhanced in the handling ability and be applied to the conventional and general single sheet production process of an electronic device.

MODE FOR CARRYING OUT THE INVENTION

The mode for carrying out the present invention is described below with reference to the drawings. In each of the drawings, for facilitating visualization of the figure, the proportional relationship in the configuration of the glass/resin laminate is exaggeratedly drawn.

Figure 1:
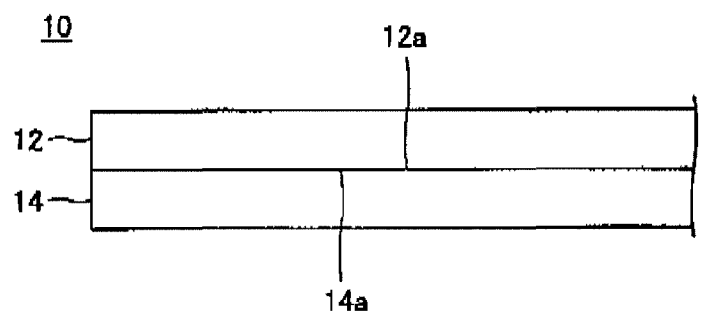
FIG. 1 is a side view showing one embodiment of the glass/resin laminate according to the present invention.

FIG. 1 is a side view showing one embodiment of the glass/resin laminate according to the present invention. The glass/resin laminate 10 is obtained by laminating together a glass substrate 12 and a resin layer 14, and one outermost layer of the laminate is the glass substrate 12. This can make the surface flatness of the glass/resin laminate 10 enhanced. In the example shown in FIG. 1, the glass substrate 12 and the resin layer 14 are in direct contact.

First, the glass substrate 12 is described.

The glass substrate 12 can be obtained by melting a glass raw material and forming the molten glass into a plate shape. The forming method may be a general forming method and, for example, a float process, a fusion process, a slot down-draw process, a redraw process or an up-draw process is used.

The glass substrate 12 may be, for example, a conventionally known alkali glass substrate containing an alkali metal oxide or may be an alkali-free glass substrate and although this is appropriately selected depending on the electronic device to be applied or the production process thereof, an alkali-free glass substrate is preferred because of its small thermal shrinkage.

If the thermal shrinkage of the glass substrate 12 is large, the constituent member (for example, an organic EL element) of an electronic device, which is formed on the heated glass substrate 12, undergoes excessive displacement during cooling. As the index of the thermal shrinkage, the linear expansion coefficient specified in JIS R 3102-1995 is used.

The average linear expansion coefficient at 25 to 300° C. (hereinafter, simply referred to as an "average linear expansion coefficient") of the glass substrate 12 is preferably from 0 to $200\times10^{-7}$/° C., more preferably from 0 to $100\times10^{-7}$/° C., and preferably from 0 to $50\times10^{-7}$/° C.

The thickness of the glass substrate 12 is not particularly limited and in view of weight reduction and thinning, it is preferably 0.3 mm or less, more preferably 0.2 mm or less, and still more preferably 0.15 mm or less. When the thickness is 0.3 mm or less, good flexibility can be imparted to the glass substrate 12, and when it is 0.15 mm or less, the glass substrate 12 can be wound into a roll. Also, the thickness of the glass substrate 12 is preferably 0.02 mm or more, because, for example, the production of the glass substrate 12 is facilitated or the glass substrate 12 is easily handled.

The shape of the glass substrate 12 is not particularly limited and may be a rectangular shape or a belt shape. In either case, the size in width direction (size in the lateral direction) of the glass substrate 12 is preferably 2,000 mm or less. If it exceeds 2,000 mm, production of the resin layer 14 that is stacked on the glass substrate 12 becomes difficult.

The resin layer 14 is described below.

The resin layer 14 contains a polyimide obtained by condensation-polymerization of an aromatic diamine having a benzoxazole structure and an aromatic tetracarboxylic anhydride. The resin layer 14 is preferably composed of only the polyimide above. The "condensation polymerization" is carried out, for example, by subjecting a diamine and a tetracarboxylic anhydride to a ring-opening polyaddition reaction in a solvent to obtain a polyimide acid solution, subsequently, if desired, forming a green film or the like from the polyimide acid solution, and then performing dehydration condensation (imidization).

<Aromatic Diamines>

The molecular structure of the aromatic diamines having a benzoxazole structure for use in this embodiment is not particularly limited, and in view of ease of synthesis, each isomer (for example, each compound represented by the following formulae (1) to (4)) of amino(aminophenyl)benzoxazole is preferred. The term "each isomer" as used herein means each isomer defined by coordination positions of two amino groups in the amino(aminophenyl)benzoxazole. These diamines may be used alone, or in combination of two or more thereof.

[Chem.1]

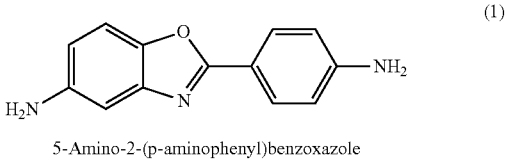

5-Amino-2-(p-aminophenyl)benzoxazole

[Chem. 2]

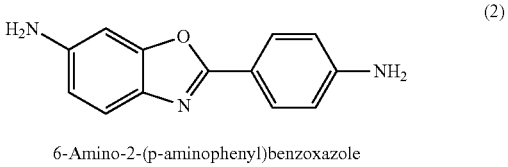

6-Amino-2-(p-aminophenyl)benzoxazole

[Chem. 3]

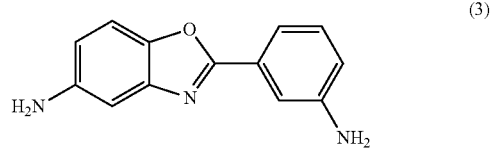

5-Amino-2-(m-aminophenyl)benzoxazole

[Chem. 4]

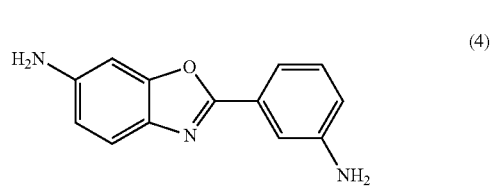

6-Amino-2-(m-aminophenyl)benzoxazole

In this embodiment, one member or two more members of the following exemplified diamines not having a benzoxazole structure may be used in combination as long as the amount thereof is less than 30 mol % based on all diamines. Examples of such diamines include 4,4'-bis(3-aminophenoxy)biphenyl, bis[4-(3-aminophenoxy)phenyl]ketone, bis[4-(3-aminophenoxy)phenyl]sulfide, bis[4-(3-aminophenoxy)phenyl]sulfone, 2,2-bis[4-(3-aminophenoxy)phenyl]propane, 2,2-bis[4-(3-aminophenoxy)phenyl]-1,1,1,3,3,3-hexafluoropropane, m-phenylenediamine, o-phenylenediamine, p-phenylenediamine, m-aminobenzylamine, p-aminobenzylamine, 3,3'-diaminodiphenyl ether, 3,4'-diaminodiphenyl ether, 4,4'-diaminodiphenyl ether, 3,3'-diaminodiphenyl sulfide, 3,3'-diaminodiphenyl sulfoxide, 3,4'-diaminodiphenyl sulfoxide, 4,4'-diaminodiphenyl sulfoxide, 3,3'-diaminodiphenyl sulfone, 3,4'-diaminodiphenyl sulfone, 4,4'-diaminodiphenyl sulfone, 3,3'-diaminobenzophenone, 3,4'-diaminobenzophenone, 4,4'-diaminobenzophenone, 3,3'-diaminodiphenyl methane, 3,4'-diaminodiphenyl methane, 4,4'-diaminodiphenyl methane, bis-[4-(4-aminophenoxy)phenyl]methane, 1,1-bis[4-(4-aminophenoxy)phenyl]ethane, 1,2-bis[4-(4-aminophenoxy)phenyl]ethane, 1,1-bis[4-(4-aminophenoxy)phenyl]propane, 1,2-bis[4-(4-aminophenoxy)phenyl]propane, 1,3-bis[4-(4-aminophenoxy)phenyl]propane, 2,2-bis[4-(4-aminophenoxy)phenyl]propane, 1,1-bis[4-(4-aminophenoxy)phenyl]butane, 1,3-bis[4-(4-aminophenoxy)phenyl]butane, 1,4-bis[4-(4-aminophenoxy)phenyl]butane, 2,2-bis[4-(4-aminophenoxy)phenyl]butane, 2,3-bis[4-(4-aminophenoxy)phenyl]butane, 2-[4-(4-aminophenoxy)phenyl]-2-[4-(4-aminophenoxy)-3-methylphenyl]propane, 2,2-bis[4-(4-aminophenoxy)-3-methylphenyl]propane, 2-[4-(4-aminophenoxy)phenyl]-2-[4-(4-aminophenoxy)-3,5-dimethylphenyl]propane, 2,2-bis[4-(4-aminophenoxy)-3,5-dimethylphenyl]propane, 2,2-bis[4-(4-aminophenoxy)phenyl]-1,1,1,3,3,3-hexafluoropropane, 1,4-bis(3-aminophenoxy)benzene, 1,3-bis(3-aminophenoxy)benzene, 1,4-bis(4-aminophenoxy)benzene, 4,4'-bis(4-aminophenoxy)biphenyl, bis[4-(4-aminophenoxy)phenyl]ketone, bis[4-(4-aminophenoxy)phenyl]sulfide, bis[4-(4-aminophenoxy)phenyl]sulfoxide, bis[4-(4-aminophenoxy)phenyl]sulfone, bis[4-(3-aminophenoxy)phenyl]ether, bis[4-(4-aminophenoxy)phenyl]ether, 1,3-bis[4-(4-aminophenoxy)benzoyl]benzene, 1,3-bis[4-(3-aminophenoxy)benzoyl]benzene, 1,4-bis[4-(3-aminophenoxy)benzoyl]benzene, 4,4'-bis[(3-aminophenoxy)benzoyl]benzene, 1,1-bis[4-(3-aminophenoxy)phenyl]propane, 1,3-bis[4-(3-aminophenoxy)phenyl]propane, 3,4'-diaminodiphenylsulfide, 2,2-bis[3-(3-aminophenoxy)phenyl]-1,1,1,3,3,3-hexafluoropropane, bis[4-(3-aminophenoxy)phenyl]methane, 1,1-bis[4-(3-aminophenoxy)phenyl]ethane, 1,2-bis[4-(3-aminophenoxy)phenyl]ethane, bis[4-(3-aminophenoxy)phenyl]sulfoxide, 4,4'-bis[3-(4-aminophenoxy)benzoyl]diphenyl ether, 4,4'-bis[3-(3-aminophenoxy)benzoyl]diphenyl ether, 4,4'-bis[4-(4-amino-α,α-dimethylbenzyl)phenoxy]benzophenone, 4,4'-bis[4-(4-amino-α,α-dimethylbenzyl)phenoxy]diphenyl sulfone, bis[4-{4-(4-aminophenoxy)phenoxy}phenyl]sulfone, 1,4-bis[4-(4-aminophenoxy)phenoxy-α,α-dimethylbenzyl]benzene, 1,3-bis[4-(4-aminophenoxy)phenoxy-α,α-dimethylbenzyl]benzene, 1,3-bis[4-(4-amino-6-trifluoromethylphenoxy)-α,α-dimethylbenzyl]benzene, 1,3-bis[4-(4-amino-6-fluorophenoxy)-α,α-dimethylbenzyl]benzene, 1,3-bis[4-(4-amino-6-methylphenoxy)-α,α-dimethylbenzyl]benzene, 1,3-bis[4-(4-amino-6-cyanophenoxy)-α,α-dimethylbenzyl]benzene, 3,3'-diamino-4,4'-diphenoxybenzophenone, 4,4'-diamino-5,5'-diphenoxybenzophenone, 3,4'-diamino-4,5'-diphenoxybenzophenone, 3,3'-diamino-4-phenoxybenzophenone, 4,4'-diamino-5-phenoxybenzophenone, 3,4'-diamino-4-phenoxybenzophenone, 3,4'-diamino-5-phenoxybenzophenone, 3,3'-diamino-4,4'-dibiphenoxybenzophenone, 4,4'-diamino-5,5'-dibiphenoxybenzophenone, 3,4'-diamino-4,5'-dibiphenoxybenzophenone, 3,3'-diamino-4-biphenoxybenzophenone, 4,4'-diamino-5-biphenoxybenzophenone, 3,4'-diamino-4-biphenoxybenzophenone, 3,4'-diamino-5'-biphenoxybenzophenone, 1,3-bis(3-amino-4-phenoxybenzoyl)benzene, 1,4-bis(3-amino-4-phenoxybenzoyl)benzene, 1,3-bis(4-amino-5-phenoxybenzoyl)benzene, 1,4-bis(4-amino-5-phenoxybenzoyl)benzene, 1,3-bis(3-amino-4-biphenoxybenzoyl)benzene, 1,4-bis(3-amino-4-biphenoxybenzoyl)benzene, 1,3-bis(4-amino-5-biphenoxybenzoyl)benzene, 1,4-bis(4-amino-5-biphenoxybenzoyl)benzene, and 2,6-bis[4-(4-amino-α,α-dimethylbenzyl)phenoxy]benzonitrile. Further, there may be mentioned aromatic diamines where a part or all of hydrogen atoms on the aromatic ring of the aromatic diamine above are substituted with a halogen atom, an alkyl or alkoxyl group having a carbon number of 1 to 3, a cyano group, a halogenated alkyl group having a carbon number of 1 to 3 with a part or all of hydrogen atoms being substituted with a halogen atom, or a halogenated alkoxyl group having a carbon number of 1 to 3 with a part or all of hydrogen atoms being substituted with a halogen atom.

<Aromatic Tetracarboxylic Anhydrides>

The tetracarboxylic anhydrides for use in this embodiment are aromatic tetracarboxylic dianhydrides. Specifically, Examples of the aromatic tetracarboxylic dianhydrides include those shown below.

[Chem. 5]

Pyromellitic anhydride:

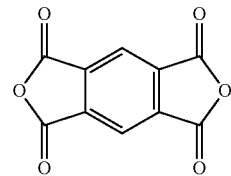

(5)

[Chem. 6]

3,3',4,4'-Biphenyltetracarboxylic anhydride:

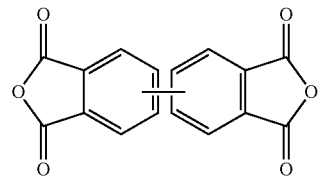

(6)

These tetracarboxylic dianhydrides may be used alone, or in combination of two or more thereof.

In this embodiment, one member or two or more members of the following non-aromatic tetracarboxylic dianhydrides may used in combination as long as the amount thereof is less than 30 mol % based on all tetracarboxylic dianhydrides. Examples of such a tetracarboxylic dianhydride include butane-1,2,3,4-tetracarboxylic dianhydride, pentane-1,2,4,5-tetracarboxylic dianhydride, cyclobutanetetracarboxylic dianhydride, cyclopentane-1,2,3,4-tetracarboxylic dianhydride, cyclohexane-1,2,4,5-tetracarboxylic dianhydride, cyclohex-1-ene-2,3,5,6-tetracarboxylic dianhydride, 3-ethylcyclohex-1-ene-3-(1,2),5,6-tetracarboxylic dianhydride, 1-methyl-3-ethylcyclohexane-3-(1,2),5,6-tetracarboxylic dianhydride, 1-methyl-3-ethylcyclohex-1-ene-3-(1,2),5,6-tetracarboxylic dianhydride, 1-ethylcyclohexane-1-(1,2),3,4-tetracarboxylic dianhydride, 1-propylcyclohexane-1-(2,3),3,4-tetracarboxylic dianhydride, 1,3-dipropylcyclohexane-1-(2,3),3-(2,3)-tetracarboxylic dianhydride, dicyclohexyl-3,4,3',4'-tetracarboxylic dianhydride, bicyclo[2.2.1]heptane-2,3,5,6-tetracarboxylic dianhydride, 1-propylcyclohexane-1-(2,3),3,4-tetracarboxylic dianhydride, 1,3-dipropylcyclohexane-1-(2,3),3-(2,3)-tetracarboxylic dianhydride, dicyclohexyl-3,4,3',4'-tetracarboxylic dianhydride, bicyclo[2.2.1]heptane-2,3,5,6-tetracarboxylic dianhydride, bicyclo[2.2.2]octane-2,3,5,6-tetracarboxylic dianhydride, and bicyclo[2.2.2]oct-7-ene-2,3,5,6-tetracarboxylic dianhydride. These tetracarboxylic dianhydrides may be used alone, or in combination of two or more thereof.

The solvent used when polymerizing diamines and tetracarboxylic acids to obtain a polyamide acid is not particularly limited as long as it can dissolve both the raw material monomer and the produced polyamide acid, and a polar organic solvent is preferred. Examples thereof include N-methyl-2-pyrrolidone, N-acetyl-2-pyrrolidone, N,N-dimethylformamide, N,N-diethylformamide, N,N-dimethylacetamide, dimethylsulfoxide, hexamethylphosphoric amide, ethyl cellosolve acetate, diethylene glycol dimethyl ether, sulfolane, and halogenated phenols. One of these solvents may be used alone, or a mixture thereof may be used. The amount of the solvent used is sufficient if it is large enough to dissolve raw material monomers. Specifically, the amount used is such an amount that the total mass of monomers occupying in the solution having dissolved therein the monomers becomes usually from 5 to 40 mass %, and preferably from 10 to 30 mass %.

As for the conditions of the polymerization reaction for obtaining the polyamide acid (hereinafter, sometimes simply referred to as a "polymerization reaction"), conventionally known conditions may be applied. Specifically, for example, stirring and/or mixing are continuously performed in an organic solvent in a temperature range of 0 to 80° C. for 10 minutes to 30 hours. If desired, the polymerization reaction may be divided, or the temperature may be raised or lowered. In this case, the order of adding two kinds of monomers is not particularly limited, and it is preferred to add aromatic tetracarboxylic anhydrides to a solution of aromatic diamines. The weight of the polyamide acid occupying in the polyamide acid solution obtained by the polymerization reaction is preferably from 5 to 50 mass % and more preferably from 10 to 30 mass %, and the viscosity of the solution as measured by a Brookfield viscometer (25° C.) is, in view of stable liquid transfer, preferably from 10 to 2,000 Pa·s, and more preferably 100 to 1,000 Pa·s.

It is effective for producing a high-quality organic solvent solution of the polyamide acid to perform vacuum defoaming during the polymerization reaction. Also, a small amount of a terminal capping agent may be added to the aromatic diamines before the polymerization reaction so as to control the polymerization. Examples of the terminal capping agent include a compound having a carbon-carbon double bond, such as maleic anhydride. In the case of using maleic anhydride, the amount thereof used is preferably from 0.001 to 1.0 mol per mol of the aromatic diamines.

Examples of the method for forming a polyimide film from the polyamide acid solution obtained by the polymerization reaction include a method of coating the polyamide acid solution on a support, drying to obtain a green film, and heat-treating the green film to effect the imdiation reaction.

The support on which the polyamide acid solution is coated is sufficient if it has smoothness and rigidity high enough to form the polyamide solution into a film shape, and examples thereof include a drum-like or belt-like roll with the surface being made of metal, plastic, glass, porcelain or the like. Above all, the surface of the support is preferably a metal, and more preferably a stainless steel which is resistant to rust and excellent in the corrosion resistance. The surface of the support may be subjected to plating with a metal such as Cr, Ni and Sn. If desired, the support surface may be mirror-finished or satin-finished. Examples of the coating of the polyamide acid solution on a support include casting from a slit spinneret, extrusion by an extruder, squeegee coating, reverse coating, die coating, applicator coating, and wire bar coating, but the coating is not limited thereto and a conventionally known technique for coating a solution can be appropriately used.

The conditions of drying the polyamide acid solution coated on a support to obtain a green film are not particularly limited, and the temperature is, for example, from 60 to 150° C., and preferably from 80 to 120° C. The drying time is, for example, from 5 to 180 minutes, preferably from 10 to 120 minutes, and more preferably from 30 to 90 minutes. As for the drying apparatus capable of achieving these conditions, a conventionally known drying apparatus can be applied, and examples thereof include hot air, heated nitrogen, far infrared ray, and high-frequency induction heating. Subsequently, an imidization reaction is performed so as to obtain the objective polyimide film from the obtained green film. In general, the imidization reaction proceeds by a treatment at a higher temperature than in the drying above, and the polyimide film can be thereby obtained.

At the imidization reaction, a cyclization catalyst and a dehydrating agent may be incorporated into the polyamide acid solution to accelerate the imidization reaction by the action of the cyclization catalyst and dehydrating agent. In this method, after the polyamide acid solution is coated on the support and the imidization reaction is allowed to partially proceed to form a film having a self-supporting property, the imidization can be completely performed by heating.

The timing of adding the cyclization catalyst to the polyamide acid solution is not particularly limited, and the catalyst may be previously added before performing the polymerization reaction of obtaining a polyamide acid. Specific examples of the cyclization catalyst include an aliphatic tertiary amine such as trimethylamine and triethylamine, and a heterocyclic tertiary amine such as isoquinoline, pyridine and beta-picoline. Above all, at least one kind of an amine selected from heterocyclic tertiary amines is preferred. The amount of the cyclization catalyst used per mol of the polyamide acid is not particularly limited and is preferably from 0.5 to 8 mol.

The timing of adding the dehydrating agent to the polyamide acid solution is also not particularly limited, and the dehydrating agent may be previously added before performing the polymerization reaction of obtaining a polyamide acid. Specific examples of the dehydrating agent include an aliphatic carboxylic anhydride such as acetic anhydride, propionic anhydride and butyric anhydride, and an aromatic carboxylic anhydride such as benzoic anhydride. Among these, acetic anhydride, benzoic anhydride and a mixture thereof are preferred. The amount of the dehydrating agent used per mol of the polyamide acid is not particularly limited and is preferably from 0.1 to 4 mol. In the case of using a dehydrating agent, a gelling retarder such as acetylacetone may be used in combination.

The polyimide film precursor (green film) formed on a support may be separated from the support before performing the complete imidization or may be separated after the imidization.

In order control the thickness of the polyimide film, the coated amount upon coating the polyamide acid solution on a support or the concentration of the polyamide acid solution can be appropriately adjusted.

In the resin layer 14 containing such a polyimide obtained by condensation-polymerizing aromatic diamines having a benzoxazole structure with aromatic tetracarboxylic anhydrides, the heat resistance is high and the average linear expansion coefficient is small, compared with the resin layer composed of a general polyimide.

The average linear expansion coefficient of the resin layer 14 is preferably from 0 to $100 \times 10^{-7}/°$ C., more preferably from 0 to $50 \times 10^{-7}/°$ C., and still more preferably from 0 to $30 \times 10^{-7}/°$ C. Within this range, the difference in the average linear expansion coefficient between the glass substrate 12 and the resin layer 14 is kept from becoming excessive.

The difference in the average linear expansion coefficient between the glass substrate 12 and the resin layer 14 is preferably from $-100\times10^{-7}$ to $+100\times10^{-7}/°$ C., more preferably from $-50\times10^{-7}$ to $+50\times10^{-7}/°$ C., and still more preferably from $-30\times10^{-7}$ to $+30\times10^{-7}/°$ C. Within this range, the stress generated between the glass substrate 12 and the resin layer 14 during heating or cooling can be reduced, and the warping or separation can be suppressed.

The method for measuring the average linear expansion coefficient of each of the glass substrate 12 and the resin layer 14 is described in detail in Examples. The average linear expansion coefficient of the polyimide film as the resin layer 14 can be easily controlled by the molecular weight of its precursor (polyamide acid) or the conditions of heat treatment. Also, at the formation of the resin layer 14, the conditions of drying and imidization steps must be controlled to reduce disturbance in the direction of molecules and to take a uniform structure.

The thickness of the resin layer 14 is not particularly limited, and in view of weight reduction and thinning, it is preferably from 0.1 mm or less. Also, from the standpoint of impact resistance, the thickness of the resin layer 14 is preferably 0.02 mm or more.

The production method of the glass/resin laminate 10 is described below.

The production method of the glass/resin laminate 10 is not particularly limited, and examples thereof include a method where a glass substrate 12 and a polyimide film as the resin layer 14 are separately prepared and the glass substrate 12 and the polyimide film are laminated together by thermal fusion bonding or the like, and a method of directly forming the resin layer 14 on the glass substrate 12.

In the former case, for the purpose of increasing the adherence between layers, in advance before lamination, a cleaning treatment and/or a surface treatment are preferably applied to at least one surface out of mutual contact surfaces 12a and 14a of the glass substrate 12 and the polyimide film as the resin layer 14.

The cleaning treatment may be a general treatment used for the cleaning of the glass or resin. Examples of the cleaning of glass include ultrasonic cleaning, ceria polishing using ceria abrasive grain, acid cleaning using hydrofluoric acid, nitric acid or the like, alkali cleaning using ammonia and potassium hydroxide, cleaning using a surfactant (including a detergent), photochemical cleaning using ultraviolet ray or ozone, and physical cleaning using plasma. These cleaning treatments are used individually or in combination. After the completion of cleaning, if desired, drying is performed to allow for no remaining of the cleaning agent.

The surface treatment may be a general treatment used for the surface treatment of the glass or resin, and examples thereof include a corona treatment, a plasma treatment, a flame treatment, and a silane coupling treatment. These surface treatments are used individually or in combination.

Examples of the silane coupling agent include 3-(meth) acryloxypropyl trimethoxysilane, 3-(meth)acryloxypropyl triethoxysilane, 3-aminopropyl triethoxysilane, 3-mercaptopropyl trimethoxysilane, 3-isocyanatepropyl triethoxysilane, and 3-glycidoxypropyl trimethoxysilane.

In the case of the method where a glass substrate 12 and a polyimide film as the resin layer 14 are separately prepared and the glass substrate 12 and the polyimide film are laminated together by thermal fusion bonding or the like, the polyimide film may be stacked on the glass substrate 12 by using a laminating apparatus or a pressing apparatus. By such lamination, adherence between the glass substrate 12 and the polyimide film can be enhanced.

In the case of the method of directly forming the resin layer 14 on the glass substrate 12, the resin layer 14 may be formed by coating the polyamide acid solution on the glass substrate 12 and drying to form a green film, and, similarly to the imidization reaction of the green film above, conducting heating in the state where the green film is formed on the glass substrate 12, thereby performing the imidization reaction of the green film.

Figure 2:
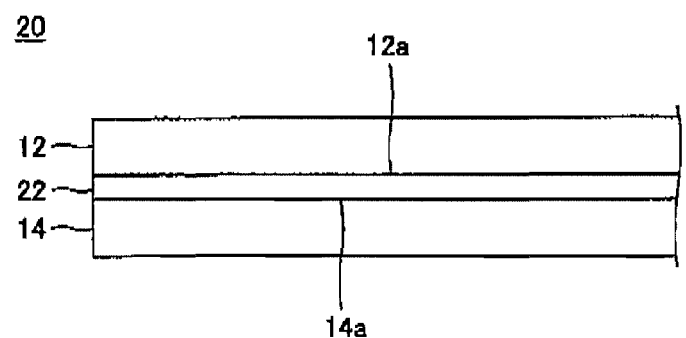
FIG. 2 is a side view showing another embodiment of the glass/resin laminate according to the present invention.

FIG. 2 is a side view showing another embodiment of the glass/resin laminate according to the present invention. The configuration of the glass/resin laminate 20 shown in FIG. 2 is described below, but for the same constituent as in the glass/resin laminate 10 shown in FIG. 1, the same numeral is used and the description thereof is omitted.

The glass/resin laminate 10 shown in FIG. 1 has a configuration where the glass substrate 12 and the resin layer 14 are in direct contact.

On the other hand, the glass/resin laminate 20 shown in FIG. 2 has a configuration where the glass substrate 12 and the resin layer 14 are laminated together through a pressure-sensitive adhesive layer 22. Thanks to the adhesive force of the pressure-sensitive adhesive layer 22, the glass substrate 12 and the resin layer 14 can be unfailingly fixed.

Incidentally, in the glass/resin laminate 10 shown in FIG. 1, a pressure-sensitive adhesive layer 22 is not provided and therefore, compared with the glass/resin laminate 20 shown in FIG. 2, not only the heat resistance can be increased but also the warping or separation during heating or cooling can be suppressed.

As for the material of the pressure-sensitive adhesive layer 22, a known material can be appropriately used, and examples thereof include thermoplastic polyamideimides, thermoplastic polyimides, thermoplastic polyimidesiloxanes, thermoplastic polyamideimidesiloxanes, polyetheretherketones, liquid crystal polymers, polyphenylene oxides, and epoxy-based resins. Among these materials, in view of heat resistance, thermoplastic polyamideimides and thermoplastic polyimides are preferred. The pressure-sensitive adhesive layer 22 containing a thermoplastic polyamideimide or a thermoplastic polyimide as the main component has a 5% heating weight loss temperature of 400° C. or more and has high heat resistance. In the present description, the "5% heating weight loss temperature" indicates a temperature at which a weight loss of 5% is caused when about 10 mg of a sample is heated at a temperature rise rate of 10° C./min by a differential thermal balance. These materials may be used alone or in combination of two or more thereof. Also, an organic or inorganic filler, a flame retardant and the like may be added to these materials.

The glass transition temperature Tg of the pressure-sensitive adhesive layer 22 is preferably from 130 to 400° C. If the glass transition temperature Tg of the pressure-sensitive adhesive layer 22 is less than 130° C., there may be a case where the pressure-sensitive adhesive layer 22 is deformed during a heat treatment in the production process of an electronic device. On the other hand, if the glass transition temperature Tg of the pressure-sensitive adhesive layer 22 exceeds 400° C., formation of the later-described multilayer film becomes difficult. The glass transition temperature Tg is preferably from 240 to 400° C.

The production method of the glass/resin laminate 20 is described below.

The production method of the glass/resin laminate 20 is not particularly limited, and examples thereof include a method where the pressure-sensitive adhesive layer 22 is formed on the resin layer 14 side-surface 12a of the glass substrate 12 and thereafter, the polyimide film as the resin layer 14 is stacked on the surface on the side coming into contact with the resin layer 14, of the pressure-sensitive adhesive layer 22, and a method where the glass substrate 12 is stacked on the surface on the side coming into contact with the glass substrate 12, of the pressure-sensitive adhesive layer 22 of a multilayer film having integrated therein the resin layer 14 and the pressure-sensitive adhesive layer 22. The case where the pressure-sensitive adhesive layer 22 is composed of a thermoplastic polyimide is described below.

In the former case, a polyamide acid solution to be the thermoplastic polyimide is coated on the glass substrate 12 and dried to form a precursor layer and subsequently, the precursor layer is subjected to an imidization reaction, whereby the pressure-sensitive adhesive layer 22 is formed.

In the latter case, examples of the method for forming a multilayer film include a method by coextrusion, a method where on a polyimide film as one layer 14 (22), the other polyamide acid solution is cast and imidized, a method where on a precursor film (green film) of the polyimide film as one layer 14 (22), a precursor film of the polyimide film as the other layer 22 (14) is stacked and these layers are imidized together, and a method where on a polyimide film as one layer 14 (22), a polyamide acid solution of the other polyimide is coated by spray coating or the like and imidized.

In both cases, the glass substrate 12/the pressure-sensitive adhesive layer 22/the resin layer 14 may be laminated together by using a laminating apparatus or a pressing apparatus. By such lamination, adherence can be enhanced.

As described above, according to the glass/resin laminate 10 (20) of this embodiment, since the resin layer 14 contains a polyimide obtained by condensation-polymerizing aromatic diamines having a benzoxazole structure and aromatic tetracarboxylic anhydrides, compared with the case where the resin layer 14 composed of a general polyimide, the heat resistance of the resin layer 14 is high and the difference in the average linear expansion coefficient between the resin layer 14 and the glass substrate 12 is from $-100 \times 10^{-7}$ to $+100 \times 10^{-7}/°$ C. Therefore, the heat resistance can be increased and at the same time, the warping or separation during heating or cooling can be suppressed. Also, since at least one outermost layer is the glass substrate 12, compared with the case where both outermost layers are a resin layer, the surface flatness can be enhanced. As a result, a constituent member (for example, an organic EL element) of an electronic device can be formed with good precision on the glass substrate 12 side-surface of the glass/resin laminate 10 (20).

In the embodiments shown in FIGS. 1 and 2, one outermost layer of the glass/resin laminate is the glass substrate 12, but the present invention is not limited thereto and both outermost layers may be a glass substrate.

Also, the laminate may be a glass/resin laminate where the glass and the resin layer are alternately stacked a plurality of times, such as glass/resin/glass/resin and glass/resin/glass/resin/glass. In this case, the repeat count of the glass and the resin is not particularly limited. Further, the method for producing a glass/resin laminate where the glass and the resin layer are alternately stacked a plurality of times is not particularly limited. The glass/resin laminate can be produced, for example, by a method where a plurality of glasses and a plurality of polyimide films are alternately stacked and bonded by heat fusion, a method of stacking them through pressure-sensitive adhesive layer(s), a method of forming a plurality of green films between a plurality of glasses and performing the imidization reaction by heating, or a method combining these methods.

The thus-obtained glass/resin laminate 10 (20) can be suitably used directly for an electronic device such as top emission-type organic EL panel, solar cell and thin-film secondary battery.

The production method of an organic EL panel (OLED) using the glass/resin laminate 10 (20) is described below.

The production method of an organic EL panel has a step of forming an organic EL element on the glass substrate 12 of the glass/resin laminate 10 (20). In this step, known techniques such as vapor deposition and encapsulation are used. The organic EL element may have a general configuration and includes, for example, an electrode layer, an organic layer containing a light emitting layer, and a transparent electrode layer, which are sequentially stacked on the glass substrate 12.

The production method of a solar cell using the glass/resin laminate 10 (20) is described below.

The production method of a solar cell has a step of forming a solar cell element on the glass substrate 12 of the glass/resin laminate 10 (20). In this step, known techniques such as photolithography, film formation, vapor deposition and encapsulation are used. The solar cell element may have a general configuration and includes, for example, an electrode layer, a semiconductor layer composed of p-type semiconductor and n-type semiconductor, and a transparent electrode layer, which are sequentially stacked on the glass substrate 12.

The production method of a thin-film secondary battery using the glass/resin laminate 10 (20) is described below.

The production method of a thin-film secondary battery has a step of forming a thin-film secondary battery element on the glass substrate 12 of the glass/resin laminate 10 (20). In this step, known techniques such as photolithography are used. The thin-film secondary battery element may have a general configuration and includes, for example, a first collector layer, a positive electrode layer, a solid electrolyte layer, a negative electrode layer, and a second collector layer, which are sequentially stacked on the glass substrate 12.

In the case where the obtained glass/resin laminate 10 (20) has a belt shape, an electronic device can be formed directly on the glass substrate 12 in the roll-to-roll production process.

On the other hand, with respect to a glass/resin laminate 10 (20) produced by cutting a belt shape glass/resin laminate 10 (20) into a rectangular form, a glass/resin laminate 10 (20) produced by laminating together a rectangular glass substrate 12 and a resin film as a rectangular resin layer 14, and a glass/resin laminate 10 (20) produced by forming a resin layer 14 on a rectangular glass substrate 12, if the thickness of the glass/resin laminate 10 (20) is small, there is the following problem.

If the thickness of the glass/resin laminate 10 (20) is small, since the glass/resin laminate 10 (20) has flexibility, when the laminate is applied to the general single sheet production process of an electronic device, there may be a case that the glass/resin laminate 10 (20) is bent and a constituent member of an electronic device is not formed with good precision on the glass substrate 12 of the glass/resin laminate 10 (20).

In this connection, when the later-described support plate is attached to the glass/resin laminate 10 (20) to form a glass substrate laminate, the glass/resin laminate 10 (20) can be kept from bending and therefore, a constituent member of an electronic device can be formed with good precision on the glass substrate 12 of the glass/resin laminate 10 (20) in the general single sheet production process of an electronic device. This effect is more marked as the thickness of the glass/resin laminate 10 (20) is smaller and is prominent particularly when the thickness of the glass/resin laminate 10

(20) is 400 μm or less. In view of handling ability, the thickness of the glass/resin laminate 10 (20) is preferably 50 μm or more.

The glass substrate laminate is described below.

Figure 3:
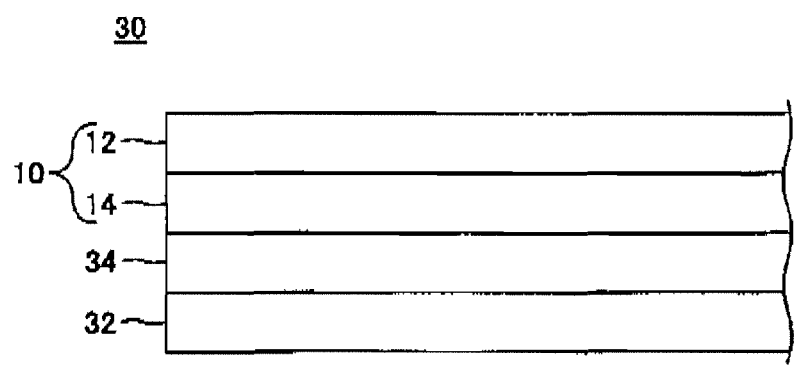
FIG. 3 is a side view showing one embodiment of the glass substrate laminate according to the present invention.

FIG. 3 is a side view showing one embodiment of the glass substrate laminate according to the present invention.

As shown in FIG. 3, the glass substrate laminate 30 has a glass/resin laminate 10, a support plate 32, and a releasable resin layer 34 having a releasable surface (hereinafter, referred to as a "releasable resin layer 34"). The glass substrate laminate 30 is in a rectangular shape, where the outermost surface of the other outermost layer of the glass/resin laminate 10 and the releasable surface of the releasable resin layer 34 are put into close contact. In the present description, "the other outermost layer of the glass/resin laminate" means the outermost layer on the side opposite one outermost layer formed by the glass substrate in the glass/resin laminate.

The glass substrate laminate 30 shown in FIG. 3 has a configuration where the glass/resin laminate 10 shown in FIG. 1 and the support plate 32 are laminated together through the releasable resin layer 34, but it is of course possible to use the glass/resin laminate 20 shown in FIG. 2 in place of the glass/resin laminate 10 shown in FIG. 1.

Incidentally, in the case of using a glass/resin laminate where both outermost layers are a glass substrate in place of the glass/resin laminate 10 shown in FIG. 1, the other outermost layer of the glass/resin laminate is also a glass substrate. Accordingly, in this case, the glass substrate and the releasable resin layer 34 are put into close contact.

The support plate 32 and the releasable resin layer 34 are described below.

<Support Plate>

The support plate 32 is not particularly limited as long as it can support the glass/resin laminate 10 through the later-described releasable resin layer 34 and reinforce the strength of the glass/resin laminate 10.

The material of the support plate 32 is not particularly limited, and in view of availability in industry, suitable examples thereof include a glass plate, a silicon wafer, a metal plate and a plastic plate.

In the case of employing a glass plate as the support plate 32, the composition thereof may be the same as that of, for example, alkali metal oxide-containing glass or alkali-free glass. Above all, an alkali-free glass is preferred because of its small thermal shrinkage.

The difference in the linear expansion coefficient between the glass/resin laminate 10 and the glass used for the support plate 32 is preferably from $-150\times10^{-7}$ to $+150\times10^{-7}/°$ C., more preferably from $-100\times10^{-7}$ to $+100\times10^{-7}/°$ C., and still more preferably from $-50\times10^{-7}$ to $+50\times10^{-7}/°$ C.

In the case of employing a plastic plate as the support plate 32, the kind thereof is not particularly limited, and examples thereof include polyethylene terephthalate resins, polycarbonate resins, a polyimide resins, fluororesins, polyamide resins, polyaramid resins, polyethersulfone resins, polyether ketone resins, polyether ether ketone resins, polyethylene naphthalate resins, polyacrylic resins, various liquid crystal polymer resins, and polysilicone resins.

In the case of employing a metal plate as the support plate 32, the kind thereof is not particularly limited, and examples thereof include a stainless steel plate and a copper plate.

The heat resistance of the support plate 32 is not particularly limited, but in the case of stacking the glass/resin laminate 10 on the support plate 32 and then forming a TFT array or the like as a constituent member of an electronic device, it is preferred to have a high heat resistance. Specifically, the above-described 5% heating weight loss temperature (temperature rise rate: 10° C./min) is preferably 300° C. or more, and more preferably 350° C. or more.

In view of this heat resistance, all of the above-described glass plates are acceptable.

In view of heat resistance, preferred examples of the plastic plate include polyimide resins, fluororesins, polyamide resins, polyaramid resins, polyethersulfone resins, polyether ketone resins, polyether ether ketone resins, polyethylene naphthalate resins, and various liquid crystal polymer resins.

The thickness of the support plate 32 is not particularly limited, but from the standpoint of reinforcing the strength of the glass/resin laminate 10, 0.3 mm or more is preferred.

Also, the thickness of the support plate 32 is preferably a thickness allowing for application to the general single sheet production process of an electronic device.

For example, the thickness is preferably from 0.1 to 1.1 mm, more preferably from 0.3 to 0.8 mm, and still more preferably from 0.4 to 0.7 mm.

For example, in the case where the current production process of an electronic device is designed to process a substrate having a thickness of 0.5 mm and the thickness of the glass/resin laminate 10 is 0.1 mm, the sum of the thickness of the support 32 and the thickness of the releasable resin layer 34 is set to 0.4 mm.

The thickness of the support plate 32 is preferably larger than the thickness of the glass/resin laminate 10.

In the case of employing a glass plate as the support 32, the surface of the support plate 32 composed of the above-described various materials may be a polished surface having been subjected to a polishing treatment or may be a non-etched surface (original surface) not subjected to a polishing treatment. In view of productivity and cost, the surface is preferably a non-etched surface (original surface).

The shape of the support plate 32 is not limited and is preferably a rectangular shape. The "rectangular shape" as used herein indicates a substantially approximate rectangular shape and includes a shape with the peripheral corners being cut off (corner-cut).

The size of the support plate 32 is not limited and, for example, in the case of a rectangular shape, the size may be from 100 to 2,000 mm×from 100 to 2,000 mm and is preferably from 500 to 1,000 mm×from 500 to 1,000 mm.

<Releasable Resin Layer>

The releasable resin layer 34 is fixed to the above-described support plate 32, and the glass/resin laminate 10 is stacked thereon. Incidentally, the releasable surface of the releasable resin layer 34 is put into close contact with the outermost surface of the other outermost layer of the glass/resin laminate 10 and has surface characteristics capable of facilitating the separation of the glass/resin laminate 10. That is, the releasable surface of the releasable resin layer 34 is bonded to the outermost surface of the other outermost layer of the glass/resin laminate 10 with a certain degree of bonding force to prevent displacement or the like of the glass/resin laminate 10 and at the same time, is bonded with such bonding force as enables easy separation without breakage of the glass/resin laminate 10 when separating the glass/resin laminate 10 from the glass substrate laminate 30. In the present invention, this property of the resin layer surface allowing for easy separation is defined as releasability.

In the glass substrate laminate 30, the releasable surface of the releasable resin layer 34 and the outermost surface of the other outermost layer of the glass/resin laminate 10 are preferably not attached with an adhesive force possessed by a pressure-sensitive adhesive but are attached through a force due to the Van der Waals force between solid molecules, that is, through a close contact force.

On the other hand, the bonding force of the releasable resin layer 34 to the surface of the support plate 32 is relatively higher than the bonding force of the releasable surface of the releasable resin layer 34 to the outermost surface of the other outermost layer of the glass/resin laminate 10. In the present invention, bonding of the releasable resin layer 34 to the glass/resin laminate 10 is referred to as close contact, and bonding to the support plate 32 is referred to as fixing.

The thickness of the releasable resin layer 34 is not particularly limited and is preferably from 5 to 50 μm, more preferably from 5 to 30 μm, and still more preferably from 7 to 20 μm. It is because, when the thickness of the releasable resin layer 34 is in this range, the glass/resin laminate 10 and the releasable resin layer 34 can be put into sufficiently close contact and also, even if an air bubble or an extraneous substance intervenes therebetween, the glass/resin laminate 10 can be kept from generation of distortion or defect. If the thickness of the resin layer is too large, formation of the layer requires time and material and this is not profitable.

Incidentally, the releasable resin layer 34 may consist of two or more layers. In this case, the "thickness of the releasable resin layer" means the total thickness of all in the releasable resin layer 34.

In the case where the releasable resin layer 34 consists of two or more layers, the resins forming respective layers may differ in the kind.

The surface tension of the releasable resin layer 34 is preferably 30 mN/m or less, more preferably 25 mN/m or less, and still more preferably 22 mN/m or less, and is preferably 15 mN/m or more. When the surface tension is in such a range, separation from the glass/resin laminate 10 is more facilitated and at the same time, sufficiently close contact with the glass/resin laminate 10 is achieved.

The releasable resin layer 34 is preferably composed of a material having a glass transition temperature lower than room temperature (about 25° C.) or not having a glass transition temperature. It is because, when this condition is satisfied, there is a tendency that the resin layer becomes non-adhesive, achieves more releasability, can more facilitate the separation from the glass/resin laminate 10 and at the same time, achieves sufficiently close contact with the glass/resin laminate 10.

The releasable resin layer 34 preferably has heat resistance. It is because, for example, in the case of forming a constituent member of an electronic device on the glass substrate 12 of the glass/resin laminate 10, the glass/resin laminate 10 can be subjected to a heat treatment in the production process of the electronic device. The heat resistance required varies depending on the production process of the electronic device but is preferably 180° C. or more, and more preferably 300° C. or more.

Also, if the elastic modulus of the releasable resin layer 34 is too high, the close contact to the glass/resin laminate 10 tends to be impaired, whereas if the elastic modulus is too low, the releasability is reduced.

The resin forming the releasable resin layer 34 is not particularly limited in its kind, and examples thereof include acrylic resins, polyolefin resins, polyurethane resins and silicone resins. Some kinds of resins may be mixed and used. Above all, silicone resins are preferred. It is because the silicone resins are excellent in the heat resistance as well as in the releasability from the glass/resin laminate 10. Moreover, in the case where the support plate 32 is a glass plate, the silicone resins can be easily fixed to the support glass plate by a condensation reaction with a silanol group on the surface. Furthermore, the silicone resin layer is also preferred in that even when treated, for example, at about 300 to 400° C. for about 1 hour, the releasability is substantially kept from deterioration.

Among silicone resins, the releasable resin layer 34 is preferably composed of a silicone resin (cured product) used for release paper. A releasable resin layer 34 formed by curing a curable resin composition to be a silicone resin for release paper on the surface of the support plate 32 has excellent releasability and is preferred. Also, thanks to its high flexibility, even if an extraneous substance such as an air bubble or a dust is entrained between the glass/resin laminate 10 and the releasable resin layer 34, the glass/resin laminate 10 can be prevented from generation of distortion or defect.

The curable silicone to be the silicone resin for release paper is classified by its curing mechanism into a condensation reaction-type silicone, an addition reaction-type silicone, an ultraviolet-curable silicone and an electron beam-curable silicone, and all types can be used. Among these, an addition reaction-type silicone is preferred. It is because the addition reaction-type silicone has easiness to cause a curing reaction, a good degree of releasability when formed into the releasable resin layer 34, and high heat resistance. The addition reaction-type silicone is a curable resin composition containing a combination of an organoalkenyl polysiloxane having a unsaturated group such as a vinyl group, an organohydrogen polysiloxane having a hydrogen atom bonded to the silicon atom, and a catalyst such as platinum-based catalyst, and which becomes a cured silicone resin when cured under ordinary temperature or by heating.

Also, the curable silicone to be a silicone resin for release paper includes, in form, a solvent type, an emulsion type and a solvent-free type, and all types can be used. Among these, a solvent-free type is preferred, because the solvent-free type is excellent in view of productivity, safety and environmental characteristics. Also, because it does not containing a solvent which causes foaming at the curing to form the resin layer, that is, at the heat curing, ultraviolet curing or electron beam curing, an air bubble is hardly allowed to remain in the releasable resin layer 34.

Specific examples of the curable silicone to be the silicone resin for release paper include KNS-320A, KS-847 (both produced by Shin-Etsu Silicone), TPR6700 (produced by GE Toshiba Silicone), a combination of vinylsilicone "8500" (produced by Arakawa Chemical Industries, Ltd.) and methylhydrogen polysiloxane "12031" (produced by Arakawa Chemical Industries, Ltd.), a combination of vinylsilicone "11364" (produced by Arakawa Chemical Industries, Ltd.) and methylhydrogen polysiloxane "12031" (produced by Arakawa Chemical Industries, Ltd.), and a combination of vinylsilicone "11365" (produced by Arakawa Chemical Industries, Ltd.) and methylhydrogen polysiloxane "12031" (produced by Arakawa Chemical Industries, Ltd.), as the commercially available trade name or model number.

Incidentally, each of the KNS-320A, KS-847 and TPR 6700 is a curable silicone previously containing a base agent and a crosslinking agent.

Also, the silicone resin forming the releasable resin layer 34 preferably has a property of scarcely allowing the components in the silicone resin layer to migrate to the glass/resin laminate 10, that is, low silicone migration property.

The production method of the glass substrate laminate of this embodiment is described below.

Figure 4:
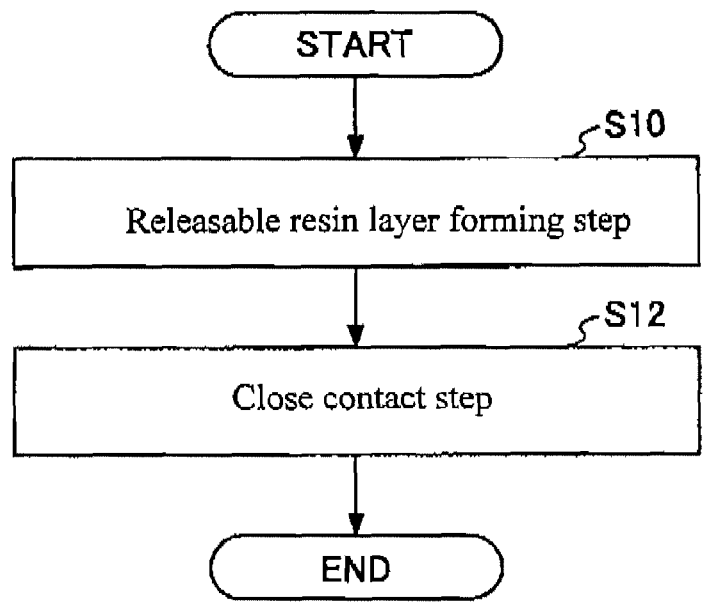
FIG. 4 is a process chart showing one embodiment of the production method of the glass substrate laminate according to the present invention.

The production method of the glass substrate laminate of this embodiment is not particularly limited, and is preferably a production method of a glass substrate laminate, comprising, for example as shown in FIG. 4, a releasable resin layer forming step (step S10) of forming and fixing a releasable resin layer 34 onto a support plate 32, and a close contact step (step S12) of putting the outermost surface of the other outermost layer of the glass/resin laminate 10 and the releasable surface of the releasable resin layer 34 into close contact. Hereinafter, such a production method is sometimes referred to as a "production method of this embodiment".

First, the releasable resin layer forming step (step S10) is described.

The method for forming a releasable resin layer 34 on a support plate 32 is not particularly limited, and includes, for example, a method of fixing a film shape releasable resin to the surface of a support plate. Specifically, there is a method of applying a surface reforming treatment (priming treatment) to the surface of the support plate so as to impart high fixed power (high peel strength) on the surface of the film and then fixing the resin on the support plate. Examples of the treatment include a chemical method (primer treatment) of chemically enhancing the fixed power, such as silane coupling agent; a physical method of increasing the surface active group, such as flame treatment; and a mechanical treating method of increasing the surface roughness and thereby increasing the anchor effect, such as sand blast treatment.

Also, for example, there is a method of coating a curable resin composition to be the releasable resin layer 34 on a support plate 32 by a known method. The known method includes a spray coating method, a die coating method, a spin coating method, a dip coating method, a roll coating method, a bar coating method, a screen printing method, and a gravure coating method. From these methods, an appropriate method can be selected according to the kind of the resin composition.

In the case of coating a curable resin composition to be the releasable resin layer 34 on a support plate 32, the amount coated is preferably 1 to 100 g/m², and more preferably 5 to 20 g/m².

For example, in the case of forming the resin layer from a curable resin composition using an addition reaction-type silicone, a curable resin composition containing a mixture of an alkenyl polysiloxane, an organohydrogen polysiloxane and a catalyst may be coated on a support plate 32 by a known method such as the above spray coating method and then heat-cured. The heat curing conditions vary depending on the blending amount of the catalyst but, for example, when a platinum-based catalyst is blended in an amount of 2 parts by mass per 100 parts by mass of the total of the alkenyl polysiloxane and the organohydrogen polysiloxane, the reaction is performed in the atmosphere at 50 to 250° C., and preferably 100 to 200° C. In this case, the reaction time is from 5 to 60 minutes, and preferably from 10 to 30 minutes. In order to form a silicone resin layer with low silicone migration property, the curing reaction is preferably allowed to proceed as far as possible so that the unreacted silicone component cannot remain in the silicone resin layer. The above-described reaction temperature and reaction time are preferred because almost no unreacted silicone component can remain in the silicone resin layer. If the reaction time is too longer than that described above or the reaction temperature is excessively high, oxidative decomposition of the silicone resin may simultaneously occur to produce a low-molecular-weight silicone component and there is possibility of elevating the silicone migration property. Letting the curing reaction to proceed as far as possible so that almost no unreacted silicone component can remain in the silicone resin layer is preferred also for improving the releasability after the heating treatment.

Furthermore, for example, when the releasable resin layer 34 is produced using a curable resin composition to be the silicone resin for release paper, a silicone resin layer is formed by heat-curing the curable resin composition coated on a support plate 32. By heat-curing the curable resin composition, the silicone resin is chemically bonded to the support plate 32 during the curing reaction. Also, the silicone resin layer is bonded to the support plate 32 by an anchor effect. By virtue of these actions, the silicone resin layer is firmly fixed to the support plate 32.

Next, the close contact step (step S12) is described.

The close contact step is a step of putting the outermost surface of the other outermost layer of the glass/resin laminate 10 and the releasable surface of the releasable resin layer 34 into close contact. The outermost surface of the other outermost layer of the glass/resin laminate 10 and the releasable surface of the releasable resin layer 34 are preferably put into close contact through a force due to the Van der Waals force between very approximate facing solid molecules, that is through a close contact force. In this case, the support plate 32 and the glass/resin laminate 10 can be held in the laminated state.

The method for stacking the glass/resin laminate 10 on the releasable surface of the releasable resin layer 34 fixed to the support plate 32 is not particularly limited and, for example, the stacking may be performed by using a known method. Examples thereof include a method of overlaying the glass/resin laminate 10 on the releasable surface of the releasable resin layer 34 under a normal pressure environment and pressure-bonding the releasable resin layer 34 and the glass/resin laminate 10 by using a roll or a press. The releasable resin layer 34 and the glass/resin laminate 10 are put into closer contact by pressure-bonding using a roll or a press, and this is preferred. Also, an air bubble entrained between the releasable resin layer 34 and the glass/resin laminate 10 is relatively easily removed by pressure-bonding using a roll or a press, and this is preferred. Pressure-bonding by a vacuum lamination method or a vacuum press method is more preferred, because this can more successfully suppress the entrainment of an air bubble or ensure the good close contact. Pressure-bonding under vacuum is also advantageous in that even if a minute air bubble remains, the air bubble is not allowed to grow by heating and distortion or defect of the glass/resin laminate 10 hardly results.

In the close contact step, when stacking the glass/resin laminate 10 on the releasable resin layer 34 on the support plate 32, the stacking is preferably performed in an environment of high cleanliness by thoroughly cleaning the outermost surface of the other outermost layer of the glass/resin laminate 10 and the releasable surface of the releasable resin layer 34. Even when an extraneous substance is entrained between the releasable resin layer 34 and the glass/resin laminate 10, this does not affect the surface flatness of the glass/resin laminate 10 because the releasable resin layer 34 is deformed, but as the cleanliness is higher, the flatness is advantageously more improved and this is preferred.

The glass substrate laminate 30 can be produced by such a production method of this embodiment.

<Production Method of Electronic Device>

Figure 5:
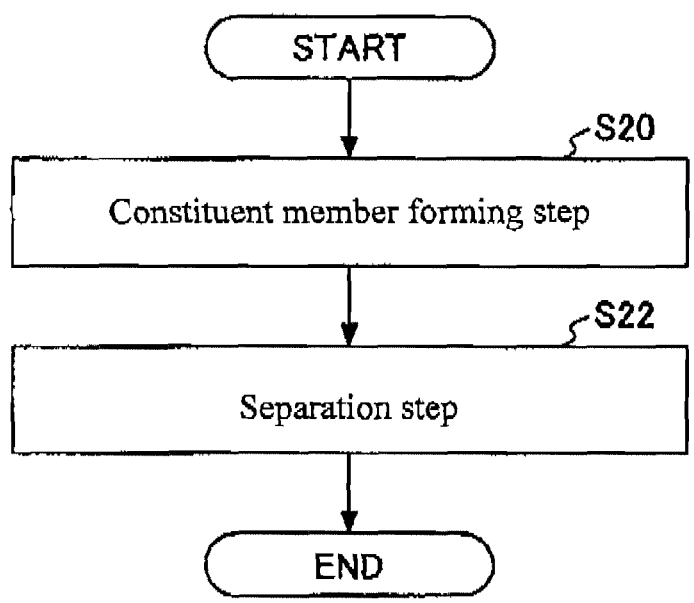
FIG. 5 is a process chart showing one embodiment of the production method of the electronic device according to the present invention.

The production method of an electronic device is not particularly limited, and the electronic device is preferably produced, for example as shown in FIG. 5, by a method comprising a constituent member forming step (step S20) of forming at least a part of constituent members of an electronic device on the surface of the glass substrate 12 of the glass substrate laminate 30, and a separation step (step S22) of separating the glass/resin laminate 10 from the releasable resin layer 34 after the constituent member forming step (step S20).

First, the constituent member forming step (step S20) is described.

The method for forming at least a part of constituent members of an electronic device on the surface of the glass substrate 12 of the glass/resin laminate is not particularly limited, and a conventionally known method may be performed according to the kind of the constituent member of the electronic device.

For example, in the case of producing OLED the step for forming an organic EL structure on the glass substrate 12 of the glass/resin laminate 10 contains various steps such as a step of forming a transparent electrode, a step of depositing a hole injection layer, a hole transport layer, a light-emitting layer, an electron transport layer or the like, and an encapsulation step. Specific examples of the treatment performed in these steps include a film formation treatment, a vapor deposition treatment and an encapsulating plate adhesion treatment. The formation of such a constituent member may be a part of the formation of all constituent members necessary for the electronic device.

Next, the separation step (step S22) is described.

The method for separating the glass/resin laminate 10 from the releasable resin layer 34 is not particularly limited. Specifically, for example, a sharp blade-like material is inserted into the interface between the outermost surface of the other outermost layer of the glass/resin laminate 10 and the releasable surface of the releasable resin layer 34 to trigger the separation and then, a mixed fluid of water and compressed air is blown, whereby the glass/resin laminate 10 and the releasable resin layer 34 can be separated. Preferably, the stack is placed on a board with the releasable resin layer 34 up and the glass/resin laminate 10 down, the glass/resin laminate 10 side is vacuum-adsorbed to the board, and in this state, a blade is caused to enter the interface between the outermost surface of the other outermost layer of the glass/resin laminate 10 and the releasable surface of the releasable resin layer 34. Thereafter, the releasable resin layer 34 is adsorbed using a plurality of vacuum adsorption pads, and the vacuum adsorption pads are raised sequentially from near the portion into which the blade is inserted. As a result, an air layer is formed into the interface, and the air layer expands over the entire surface of the interface, whereby the glass/resin laminate 10 and the releasable resin layer 34 can be easily separated.

By the production method above, an electronic device where at least a part of constituent members of the electronic device is formed on the glass substrate 12 of the glass/resin laminate 10, is obtained. In the case where the constituent member on the glass substrate 12 at the separation is a part of the formation of all constituent members necessary for the electronic device as described above, the remaining constituent members are formed afterward on the glass substrate 12 of the glass/resin laminate 10 to produce the electronic device.

EXAMPLES

The present invention is specifically described below with reference to Examples, but the present invention should not be construed as being limited to the following Examples. The methods for evaluating the physical properties in Examples are as follows.

1. Reduced Viscosity ($\eta sp/C$) of Polyamide Acid

A solution prepared by dissolving the polymer in N-methyl-2-pyrrolidone to a concentration of 0.2 g/dl was measured at 30° C. by a Ubbelohde viscometer tube.

2. Thicknesses of Glass Substrate 12 and Polyimide Film as Resin Layer 14

The thickness was measured using a micrometer (MDC25J, manufactured by Mitsutoyo Corp.).

3. Average Linear Expansion Coefficients of Glass Substrate 12 and Polyimide Film as Resin Layer 14

The degree of shrinkage was measured under the following conditions to determine the average linear expansion coefficient.

Name of apparatus: TMA4000S manufactured by MAC Science
Sample length: 20 mm
Sample width: 2 mm
Temperature-rise start temperature: 20° C.
Temperature-rise end temperature: 310° C.
Temperature rise rate: 5° C./min
Atmosphere: argon 4. Warping of Specimen A specimen (50 mm×300 mm) was placed on a board, and the maximum value of the gap between the board and each of the longitudinal central part and longitudinal both end parts of the specimen was measured by a gap gauge.

5. Minimum Bending Radius of Specimen

A specimen (50 mm×200 mm) was left standing in an environment of 23° C. and 50% RH for 48 hours and bent by winding it around a stainless steel-made cylinder, and the minimum bending radius when the outer appearance was observed and found to have no damage was measured, 6. Water Vapor Permeability of Specimen The water vapor permeability was measured using a water vapor permeability measuring apparatus (Model 7001, manufactured by DKSH) in an environment of 38° C. and 90% RH by the method in accordance with ASTM E-96-63T.

Example 1

In Example 1, the glass/resin laminate 10 shown in FIG. 1 was produced as the specimen.

(Cleaning Treatment of Glass Substrate 12)

For the glass substrate 12, an alkali-free glass substrate of 500 mm width×70 μm thickness (AN100, produced by Asahi Glass Co., Ltd.) obtained by a float process was used. The average linear expansion coefficient of this glass substrate 12 was $38 \times 10^{-7}/°$ C.

Both surfaces of the glass substrate 12 were activated by UV cleaning. Subsequently, the glass substrate 12 was wound into a roll while stacking a protective film on each of both surfaces of the glass substrate 12.

(Surface Treatment for Glass Substrate 12)

The protective film stacked on both surfaces of the glass substrate 12 was peeled off while unrolling the glass substrate 12 wound into a roll, and a silane coupling treatment was applied to the surface 12a on the side coming into contact with the resin layer 14, of the glass substrate 12. Specifically, an ethanol solution of 1 mass % of 3-glycidoxypropyltrimethoxysilane (KBM-403, produced by Shin-Etsu Silicone) was sprayed on the surface 12a on the side coming into contact with the resin layer 14, of the glass substrate 12 and thereafter, hot-air drying was performed.

(Preparation of Polyamide Acid Solution)

After nitrogen-purging the inside of a reaction vessel equipped with a nitrogen inlet tube, a thermometer and a stirring rod, 500 parts by mass of 5-amino-2-(p-aminophenyl) benzoxazole was charged, and 8,000 parts by mass of N,N-dimethylacetamide was added thereto and completely dissolved. Furthermore, 485 parts by mass of pyromellitic dianhydride was added, and the mixture was stirred at 25° C. for 48 hours, as a result, a brown viscous polyamide acid solution was obtained. The reduced viscosity ($\eta sp/C$) of the obtained solution was 4.0 dl/g.

(Production of Polyamide Acid Film)

This polyamide acid solution was coated on a lubricant-free surface of a polyethylene terephthalate film (A-4100, produced by Toyobo Co., Ltd.) by using a comma coater and then dried at 110° C. for 5 minutes to obtain a polyamide acid film (green film).

(Production of Heat-Resistant Polyimide Film as Resin Layer 14)

This polyamide acid film was held by a pin tenter, passed through a continuous-type heat treatment furnace and thereby heat-treated at 150° C. for 2 minutes, then at 220° C. for 2 minutes and further at 475° C. for 4 minutes, and thereafter, the film was cooled and cut to obtain a heat-resistant polyimide film of 500 mm width×30 μm thickness. The obtained heat-resistant polyimide film had an average linear expansion coefficient of $30 \times 10^{-7}$/° C., a difference in the average linear expansion coefficient from the glass substrate 12 of $8 \times 10^{-7}$/° C., and a 5% heating weight loss temperature of 550° C.

(Surface Treatment of Heat-Resistant Polyimide Film)

This heat-resistant polyimide film was wound into a roll and then, while unrolling the film, the surface on the side coming into contact with the glass substrate 12, of the heat-resistant polyimide film was irradiated with plasma by using a normal-pressure remote plasma apparatus (manufactured by Sekisui Chemical Co., Ltd.). Here, the treatment conditions were set to an output of 3 kw, a nitrogen/air flow rate ratio of 600 slm/750 sccm, and a conveying speed of 1 m/min.

(Lamination of Glass Substrate 12 and Heat-Resistant Polyimide Film as Resin Layer 14)

The glass substrate 12 after the silane coupling treatment and the heat-resistant polyimide film after the plasma treatment were passed between metal rollers (diameter: 200 mm) at a surface temperature of 315° C. at a speed of 5 m/min to obtain the glass/resin laminate 10 shown in FIG. 1.

Example 2

In Example 2, the glass/resin laminate 20 shown in FIG. 2 was produced as the specimen.

(Glass Substrate 12)

For the glass substrate 12, an alkali-free glass substrate of 500 mm length×500 mm width×45 μm thickness (AN100, produced by Asahi Glass Co., Ltd.) obtained by a float process was used. The average linear expansion coefficient of this glass substrate 12 was $38 \times 10^{-7}$/° C.

(Resin Layer 14)

For the resin layer 14, a heat-resistant polyimide film of 500 mm length×500 mm width×30 μm thickness produced in the same manner as in Example 1 was used. This heat-resistant polyimide film had an average linear expansion coefficient of $30 \times 10^{-7}$/° C. and a difference in the average linear expansion coefficient from the glass substrate 12 of $8 \times 10^{-7}$/° C.

(Production of Thermoplastic Polyimide Film as Pressure-Sensitive Adhesive Layer 22)

After nitrogen-purging the inside of a reaction vessel equipped with a nitrogen inlet tube, a thermometer and a stirring rod, 368.4 parts by mass of 4,4'-bis(3-aminophenoxy)biphenyl, 59.24 parts by mass of phthalic anhydride, 174.5 parts by mass of pyromellitic anhydride and 172 parts by mass of m-cresol were charged, and the resulting mixture was stirred at 200° C. for 6 hours. Toluene was added to the stirred solution, and the precipitate was collected by filtration, further washed with toluene three times and then dried at 250° C. for 6 hours in a nitrogen atmosphere to obtain 510 parts by mass (yield: 90.1%) of a polyimide powder.

This polyimide powder was kneaded, melted and extruded at 380 to 410° C. by using a twin-screw extruder and thereby granulated into pellets. The obtained pellets were supplied to a single-screw extruder (forming temperature: 420° C.) with a diameter of 50 mm, passed through a 10-μm leaf disc-type filter attached in front of a T-die, and extruded from the T-die with a width, of 1,100 mm to obtain a 25 μm-thick thermoplastic polyimide film as the pressure-sensitive adhesive layer 22. The 5% heating weight loss temperature (temperature rise rate: 10° C./min) of the thermoplastic polyimide film was 580° C., and the glass transition temperature Tg was 270° C.

(Lamination of Glass Substrate 12 and Resin Layer 14 Through Pressure-Sensitive Adhesive Layer 22)

The thermoplastic polyimide film was set between the glass substrate 12 and the heat-resistant polyimide film, and these were pressurized at 300° C. under 1 MPa for 5 minutes by a hot press apparatus to obtain the glass/resin laminate 20 shown in FIG. 2.

Comparative Example 1

In Comparative Example 1, a glass/resin laminate was obtained in the same manner as in Example 2 except for using a 30 μm-thick polyimide film (Kapton H, produced by Du Pont-Toray Co., Ltd.) as the resin layer 14. The above-described polyimide film (Kapton H) is obtained by condensation-polymerizing pyromellitic anhydride and diaminodiphenyl ether, and has an average linear expansion coefficient of $270 \times 10^{-7}$/° C. and a difference in the average linear expansion coefficient from the glass substrate 12 of $232 \times 10^{-7}$/° C.

Comparative Example 2

In Comparative Example 2, the above-described polyimide film (Kapton H) was used as a specimen.

Comparative Example 3

In Comparative Example 3, an alkali-free glass film with a thickness of 100 μm (AN100, produced by Asahi Glass Co., Ltd.) was used as a specimen.

With respect to each of Examples and Comparative Examples, the results of the evaluations above are shown together in Table 1.

TABLE 1

| | | Ex. 1 | Ex. 2 | Ex. 3 | Comp. Ex. 1 | Comp. Ex. 2 | Comp. Ex. 3 |
|---|---|---|---|---|---|---|---|
| Minimum bending radius | | 25 | 25 | 25 | 25 | 10 or less | 40 |
| Warping (front surface) | End part (mm) | 0.0 | 0.0 | 0.0 | 2.0 | 0.0 | 0.0 |
| | Central part (mm) | 0.0 | 0.0 | 0.0 | 0.0 | 0.0 | 0.0 |
| Warping (back surface) | End part (mm) | 0.0 | 0.0 | 0.0 | 0.0 | 0.0 | 0.0 |
| | Central part (mm) | 0.0 | 0.0 | 0.0 | 1.9 | 0.0 | 0.0 |
| Water vapor permeability (g/m²/24 hours/mm) | | 0.0 | 0.0 | 0.0 | 0.0 | 2.0 | 0.0 |

It can be seen from Table 1 that the glass/resin laminates of Examples 1 and 2 show little warping in the course of cooling after lamination, compared with Comparative Example 1. Also, it can be seen from Table 1 that the glass/resin laminates of Examples 1 and 2 are excellent in the moisture permeation resistance, compared with Comparative Example 2. Furthermore, it can be seen from Table 1 that the glass/resin laminates of Examples 1 and 2 are excellent in the flexibility, compared with Comparative Example 3.

Example 3

In Example 3, the glass/resin laminate 10 shown in FIG. 1 was produced as the specimen by a method different from Example 1.
(Cleaning Treatment of Glass Substrate 12)
For the glass substrate 12, an alkali-free glass substrate of 500 mm width×70 μm thickness (AN100, produced by Asahi Glass Co., Ltd.) obtained by a float process was used. The average linear expansion coefficient of this glass substrate 12 was $38 \times 10^{-7}$/°C.

Both surfaces of the glass substrate 12 were activated by UV cleaning. Subsequently, the glass substrate 12 was wound into a roll while stacking a protective film on each of both surfaces of the glass substrate 12.
(Surface Treatment for Glass Substrate 12)
The protective film stacked on both surfaces of the glass substrate 12 was peeled off while unrolling the glass substrate 12 wound into a roll, and a silane coupling treatment was applied to the surface 12a on the side coming into contact with the resin layer 14, of the glass substrate 12. Specifically, an ethanol solution of 1 mass % of 3-glycidoxypropyltrimethoxysilane (KBM-403, produced by Shin-Etsu Silicone) was sprayed on the surface 12a on the side coming into contact with the resin layer 14, of the glass substrate 12 and thereafter, hot-air drying was performed.
(Preparation of Polyamide Acid Solution)
After nitrogen-purging the inside of a reaction vessel equipped with a nitrogen inlet tube, a thermometer and a stirring rod, 500 parts by mass of 5-amino-2-(p-aminophenyl) benzoxazole was charged, and 8,000 parts by mass of N,N-dimethylacetamide was added thereto and completely dissolved. Furthermore, 485 parts by mass of pyromellitic dianhydride was added, and the mixture was stirred at 25° C. for 48 hours, as a result, a brown viscous polyimide acid solution was obtained. The reduced viscosity (ηsp/C) of the obtained solution was 4.0 dl/g.
(Production of Glass/Resin Laminate)
This polyimide acid solution was coated on the glass substrate 12 after the silane coupling treatment by using a comma coater, passed through a continuous-type heat treatment furnace, and thereby heat-treated at 110° C. for 2 minutes, at 150° C. for 2 minutes, then at 220° C. for 2 minutes and further at 475° C. for 4 minutes to obtain the glass/resin laminate 10 shown in FIG. 1.

Example 4

First, a support glass plate with a length of 500 mm, a width of 500 mm, and a thickness of 0.6 mm and having a linear expansion coefficient of $38 \times 10^{-7}$/° C. (AN100, produced by Asahi Glass Co., Ltd.) was subjected to surface cleaning by pure water cleaning and UV cleaning and thus prepared as the support plate.

Next, as the resin for forming the releasable resin layer, linear dimethyl polysiloxane having vinyl groups at both terminals and methylhydrogen polysiloxane having a hydrosilyl group in the molecule were used. These resins were mixed with a platinum-based catalyst to prepare a mixture, and the mixture was coated on the first principal surface of the support glass plate to a size of 499 mm in length and 499 mm in width by using a die-coating apparatus (coated amount: 20 g/m²), and heat-cured in the atmosphere at 210° C. for 30 minutes to form a silicone resin layer having a thickness of 20 μm, whereby a support glass plate having fixed to the surface thereof a silicone resin. Here, the mixing ratio of linear dimethyl polysiloxane and methylhydrogen polysiloxane was adjusted such that the molar ratio between the hydrosilyl group and the vinyl group becomes 0.9/1. The platinum-based catalyst was added in an amount of 5 parts by mass per 100 parts by mass of the total of linear dimethyl polysiloxane and methylhydrogen polysiloxane.

Subsequently, using the glass/resin laminate 10 obtained in Example 1, the releasable surface of the silicone resin layer fixed to the support glass plate surface and the outermost surface of the resin layer 14 of the glass/resin laminate 10 were laminated together at room temperature with a vacuum press by arranging the centroids of both substrates to coincide, whereby Glass Substrate Laminate A (Glass Substrate Laminate A of the present invention) was obtained.

In Glass Substrate Laminate A according to Example 4, the resin layer 14 of the glass/resin laminate 10 and the releasable surface of the silicone resin layer were put into close contact without generation of an air bubble, giving good smoothness with no concave defect.

Example 5

In this Example, OLED is produced using Glass Substrate Laminate A obtained in Example 4.

An organic EL structure is formed on the surface of the glass substrate 12 of Glass Substrate Laminate A through a step of forming a transparent electrode, a step of forming an auxiliary electrode, a step of depositing a hole injection layer, a hole transport layer, a light-emitting layer, an electron transport layer and the like, and a step of encapsulating these.

Subsequently, the organic EL structure side is vacuum-adsorbed to a board, and a stainless steel-made blade having a thickness of 0.1 mm is inserted into the interface between the outermost surface of the resin layer 14 of the glass/resin laminate 10 and the releasable surface of the silicone resin layer in the corner part of Glass Substrate Laminate A to trigger the separation of the outermost surface of the resin layer 14 of the glass/resin laminate 10 from the releasable surface of the silicone resin. Thereafter, the support glass plate surface of Glass Substrate Laminate A is adsorbed using 24 vacuum adsorption pads, and the adsorption pads are raised sequentially from near the corner part of Glass Substrate Laminate A, into which the stainless steel-made blade is inserted. As a result, the support glass plate to which the silicone resin is fixed can be separated while allowing only the glass/resin laminate 10, on which the organic EL structure is formed, to remain on the board.

Subsequently, the glass/resin laminate 10 is cut using a laser cutter or a scribe-break system and thereby divided into 80 cells each having a size of 41 mm length×30 mm width. Thereafter, the glass/resin laminate 10, on which the organic EL structure is formed, and a counter substrate are assembled, and the assembly is subjected to a module forming step to produce OLED. The thus-obtained OLED is free from a problem in the characteristics.

While the invention has been described in detail and with reference to specific embodiments thereof, it will be apparent to one skilled in the art that various changes and modifications can be made therein without departing from the spirit and scope of the invention.

This application is based on Japanese Patent Application No. 2009-207411 filed on Sep. 8, 2009, the contents of which are incorporated herein by way of reference.

DESCRIPTION OF REFERENCE NUMERALS AND SIGNS 10, 20 Glass/resin laminate
12 Glass substrate
14 Resin layer
22 Pressure-sensitive adhesive layer
30 Glass substrate laminate
32 Support plate
34 Releasable resin layer

The invention claimed is:

1. A glass/resin laminate comprising a glass substrate and a resin layer,
wherein the resin layer contains a polyimide obtained by condensation polymerization of an aromatic diamine having a benzoxazole structure with an aromatic tetracarboxylic anhydride,
the difference in the average linear expansion coefficient at 25 to 300° C. between the glass substrate and the resin layer is from $-100 \times 10^{-7}$ to $+100 \times 10^{-7}/°$ C., and
at least one outermost layer of the laminate is the glass substrate, and wherein the glass substrate and the resin layer are in direct contact.

2. The glass/resin laminate according to claim 1, wherein at least either one surface of mutual contact surfaces of the glass substrate and the resin layer is surface-treated.

3. The glass/resin laminate according to claim 2, wherein the surface treatment contains at least anyone of a corona treatment, a plasma treatment, a flame treatment and a silane coupling treatment.

4. The glass/resin laminate according to claim 1,
wherein the glass substrate is in a rectangular or belt shape; and
the size in width direction of the glass substrate is 2,000 mm or less.

5. The glass/resin laminate according to claim 1, wherein the thickness of the glass substrate is 0.3 mm or less.

6. The glass/resin laminate according to claim 1, wherein the thickness of the resin layer is 0.1 mm or less.

7. An electronic device comprising the glass/resin laminate according to claim 1.

8. A glass substrate laminate comprising the glass/resin laminate according to claim 1, a support plate, and a releasable resin layer having a releasable surface,
wherein the glass/resin laminate and the support plate are laminated through the releasable resin layer so that the outermost surface of the other outermost layer of the glass/resin laminate and the releasable surface of the releasable resin layer fixed to the surface of the support plate are put into close contact.

9. The glass substrate laminate according to claim 8, wherein the releasable resin layer contains at least anyone of an acrylic resin, a polyolefin resin, a polyurethane resin and a silicone resin.

10. The glass substrate laminate according to claim 8, wherein the thickness of the glass/resin laminate is from 50 to 400 μm.

11. The glass substrate laminate according to claim 8, wherein the material of the support plate contains a material having a 5% heating weight loss temperature of 300° C. or more.

12. The glass substrate laminate according to claim 8, wherein the support plate is formed of a glass plate, a silicon wafer, a plastic plate or a metal plate, and has a thickness of 0.3 mm or more.

13. A method for producing the glass substrate laminate according to claim 8, comprising:
a releasable resin layer forming step of forming and fixing the releasable resin layer on the support plate, and
a close contact step of putting the outermost surface of the other outermost layer of the glass/resin laminate and the releasable surface of the releasable resin layer into close contact.

14. A glass substrate laminate for production of an electronic device, obtained by forming at least a part of constituent members of the electronic device on the glass substrate surface of the glass substrate laminate according to claim 8.

15. A method for producing an electronic device having a glass/resin laminate, comprising forming at least a part of constituent members of the electronic device on the glass substrate surface of the glass substrate laminate according to claim 8 and thereafter, separating the glass/resin laminate from the releasable resin layer.

* * * * *